United States Patent [19]

Kubala

[11] Patent Number: 4,976,282
[45] Date of Patent: Dec. 11, 1990

[54] COOLANT UNION WITH FLUID ACTUATED SEAL ASSEMBLY

[75] Inventor: Zbigniew Kubala, Wroclaw, Poland
[73] Assignee: Deublin Company, Northbrook, Ill.
[21] Appl. No.: 336,755
[22] Filed: Apr. 12, 1989
[51] Int. Cl.⁵ .................. F16L 27/00; F16L 17/00
[52] U.S. Cl. ..................... 137/580; 285/98; 285/101
[58] Field of Search .............. 137/580; 285/98, 100, 285/101

[56] References Cited

U.S. PATENT DOCUMENTS

| | | | |
|---|---|---|---|
| 2,279,969 | 4/1942 | Casperson | 285/101 |
| 2,390,892 | 12/1945 | McCormack | 285/101 |
| 3,469,850 | 9/1969 | Jackson et al. | 285/98 |
| 3,889,983 | 6/1975 | Freize et al. | 285/98 |
| 4,848,400 | 7/1989 | Grant et al. | 137/580 |

OTHER PUBLICATIONS

Deublin Rotating Unions, Engineering Catalog 869A, pp. 26–28, Deublin Company, P.O. Box 2157, 1919 Stanley Street, Northbrook, IL. 60065-2157, 1987.

*Primary Examiner*—A. Michael Chambers
*Attorney, Agent, or Firm*—Emrich & Dithmar

[57] ABSTRACT

A rotating union including a seal assembly having a rotating seal member carried by the rotor, a non-rotating floating seal member carried by a fluid actuated assembly mounted in and keyed to the housing of the union, the fluid actuated assembly including a flexible diaphragm interposed in the fluid flow path and which is flexed responsive to fluid pressure through the union to move the non-rotating seal member into engagement with the rotating seal member, the diaphragm being unflexed in the absence of fluid pressure through the union whereby the non-rotating seal member is maintained out of engagement with the rotating seal member.

20 Claims, 2 Drawing Sheets

COOLANT UNION WITH FLUID ACTUATED SEAL ASSEMBLY

BACKGROUND OF THE INVENTION

This invention relates to rotating union type coupling devices, and more particularly to sealing assemblies for rotating unions.

Rotating unions are used in applications to couple the outlet of fluid sources to rotating devices. For example, rotating unions are used extensively in the paper processing industry, in high speed drilling and boring transfer operations, high speed machine tool spindles, clutch and brake operations etc.

In high speed drilling apparatus, the rotating unions are used to conduct fluids such as water, or other coolant, from a source to a rotating drill bit. In known rotating unions, a sealing assembly within the rotating union provides the interface between the fixed outlet of the fluid source and the rotating device. The rotor shaft of the rotating union mounts a first seal member for rotation therewith. A second seal member is non-rotatably mounted within the housing of the union. The non-rotating seal member is urged into fluid-tight engagement with the rotating seal face under the force of a bias means, typically a spring arrangement. The coolant fluid which passes through the union lubricates the seal member to minimize wear. In some instances, coolant fluid is not used and thus, the bearing surfaces are unlubricated resulting in increased wear on the seal faces. With extended use, leakage will occur around the seal because of scoring of the seal faces and in particular the seal face of the rotating seal member. Because the rotating seal member is either permanently attached to the rotor, or is integrally formed with the rotor, replacement of a damaged or scored rotating seal member requires replacement of the entire rotor assembly. This is a difficult and expensive operation and requires considerable amount of down time for the apparatus on which the rotating union is used. Thus, it would be desirable to have a rotating union in which wear of the seal assembly is minimized.

Moreover, rotating unions with this type of rotating seal arrangement have been limited to speeds of 15,000 revolutions per minute. It also would be desirable to have a rotating union capable of use at higher speeds than those presently available.

SUMMARY OF THE INVENTION

The present invention provides an improved rotating union which is characterized by extended useful lifetime as compared to that for rotating unions presently available.

Another object of the invention is to provide a rotating union capable of operating at higher speeds than those for known rotating unions.

More specifically the present invention has provided a rotating union including a housing, a rotor rotatably mounted in the housing at one end thereof and adapted for coupling to a rotating device adapted to receive fluid conducted through the rotating union, a discharge passageway extending axially through the rotor, a fluid inlet chamber at the other end of the housing, and sealing means providing a rotating seal between the inlet chamber of the housing and the discharge passageway of the rotor, the sealing means comprising rotating seal means having a seal surface and being mounted on the rotor to rotate with the rotor, non-rotating seal means having a seal surface located in the inlet chamber opposing the rotating seal means, the non-rotating seal means being supported for movement within the inlet chamber axially of the housing between a first position in which the non-rotating seal means is spaced apart from the rotating seal means and a second position in which the seal surface of the non-rotating seal means engages the seal surface of the rotating seal means, and fluid actuated means mounted in the inlet chamber and connected to the non-rotating seal means for acting upon the non-rotating seal means to maintain the non-rotating seal means at the first position to maintain the seal surfaces disengaged from one another in the absence of fluid flow through the inlet chamber, and to move the non-rotating seal means to the second position, driving the seal surface of the non-rotating seal means into engagement with the seal surface of the rotating seal means in response to fluid flow through the inlet chamber, and maintaining the seal surfaces in engagement as long as fluid continues to flow through the inlet chamber.

The invention consists of certain novel features and structural details hereinafter fully described, illustrated in the accompanying drawings, and particularly pointed in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF A PREFERRED EMBODIMENT

Figure 1:
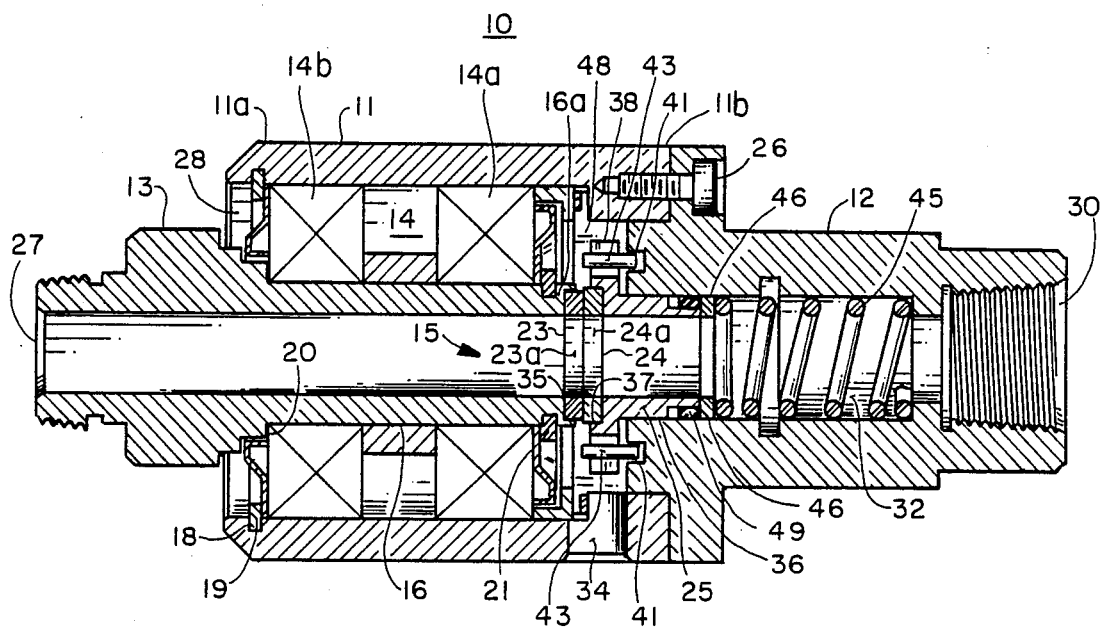
FIG. 1, which is labelled "PRIOR ART", is a side sectional view of a known rotating union.

Referring to FIG. 1 which is labelled "PRIOR ART", there is illustrated a rotating union 10, which may be, for example, a coolant union of the Model 1107 series commercially available from Deublin Company, Northbrook, Ill. The rotating union is designed for high speed drilling and boring applications. In some uses, coolant is supplied to the drill bit through the rotating union. In other uses, the drilling operation is carried out without coolant being supplied to the drill bit through the rotating union.

The rotating union 10 includes a cylindrical housing 11, an end cap 12, a tubular rotor 13, a rotor bearing assembly 14 and a seal assembly 15 including a rotating seal member 23 and a non-rotating seal member 24 carried by carrier sleeve 25. The housing 11 is formed of steel or other suitable material. The rotor 13, which is rotatably mounted in enlarged axial bore 28 in end 11a of the housing 11, is composed, for example, of steel and has an axial discharge bore or passageway 27 therethrough. The rotor bearing assembly 14 includes inner and outer ball bearings 14a and 14b which are seated in the axial bore 28 of the housing and are assembled with and surround the inner stem portion 16 of the rotor 13, thus affording an anti-friction bearing support for the rotor. The outer races of these two bearings are confined between a counterbore 18 of the housing 11 and a snap ring 19. The inner races of these bearings are confined between an internal shoulder 20 on rotor 13 and a snap ring 21 carried by the tubular stem 16 of the rotor.

The rotor 13 is coupled to the driving element of the drill bit (not shown) which is to receive coolant through the union 10. The rotor 13 is driven by the driving element (not shown) to which it is coupled and is revolved at a rate determined by the driving element, typically a maximum speed of 15,000 RPM.

The end cap 12 is secured to the housing 11 at its other end 11b by fasteners, such as machine screw 26, and defines an internally threaded fluid inlet 30 which communicates with a cylindrical axial bore defining a passageway 32 of the end cap. The threaded inlet is adapted for connection to a supply conduit (not shown) connecting with the outlet of a fluid supply source (not shown).

The rotating seal member 23 is mounted on the rotor 13 at the end 16a of its shank portion 16 which defines a countersunk peripheral edge 35. The seal member 23 is permanently secured to the edge 35 in a suitable manner such as by bonding.

The non-rotating seal member 24 is carried by and bonded to generally hollow cylindrical carrier sleeve 25 having a main body portion 36 with a peripheral edge 37 formed with a counterbore to define a recess, a peripheral mounting flange 38 projecting radially outwardly from the main body portion 36 near its peripheral edge. The seal member 24 is received within the recessed edge 37. Key slots (not shown) are defined at diametrically opposed positions along the peripheral flange and are aligned with apertures 41 in the inner vertical surface of the end cap 12 forward of the inlet chamber 30. Key pins 43 pass through the key slots and into the apertures 41 to prevent rotation of the sleeve 25 and the seal member 24 carried thereby relative to the housing 11.

The non-rotating seal member carrier sleeve 25 is dimensioned and mounted within the passageway 32 so as to be capable of forward sliding motion, as well as a limited tilting or angular floating motion within the passageway 32.

Confined in the passageway 32 is a compression spring 45, the pressure of which is transmitted forwardly against the end of the non-rotating seal member 24 through the sleeve 25 and an annular thrust ring 46, maintaining seal member 24 in sealing engagement with the rotating seal member 23. The interfacing surfaces the seal members 23 and 24 are lap ground to define closely fitting seal surfaces. Leakage forwardly of the sleeve 25 between the outer surface of the sleeve and the inner surface of end cap 12 into the space 48 is prevented by the O-ring 49 which seats on the forward edge 50 of the sleeve 25. The housing 11 defines a vent 34 through its outer wall in the proximity of the seal members.

The fluid inlet 30 of the rotating union 10 is connected to a source of fluid under pressure, which is to be conducted through the rotating union to the device with which the rotating union 10 is associated. Fluid conducted through the fluid inlet 30 enters the axial bore or passageway 32, passes through axial bore of sleeve 25, axial bores 23a and 23b in the seal members 23 and 24, and through the discharge bore 27 of the rotor 13 to the rotating device which is connected to the rotor 13.

In use, the coolant supplied through the rotating coolant union 10 to the rotating drill bit also lubricates the seal members 23 and 24 to minimize wear of the seal surfaces. In instances when coolant is not used, the bearing surfaces are unlubricated. Because in prior art rotating coolant unions, such as that illustrated in FIG. 1, the seal members 23 and 24 are maintained in engagement with one another constantly under the force of bias spring 45, wear scoring of the seal surfaces will occur limiting the useful lifetime of the seal members.

Figure 2:
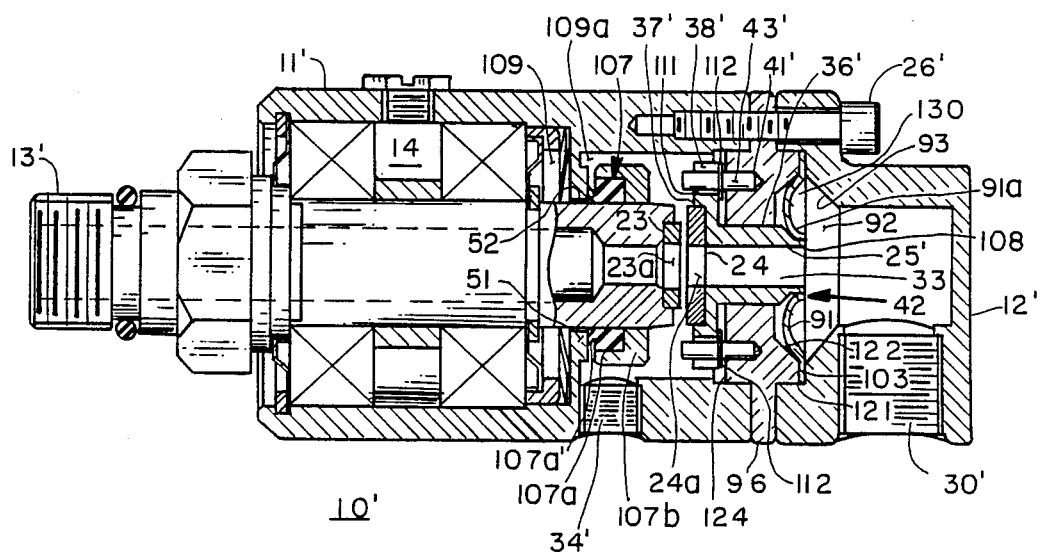
FIG. 2 is a side sectional view of a rotating union provided by the present invention illustrated with its seal faces disengaged.
Figure 3:
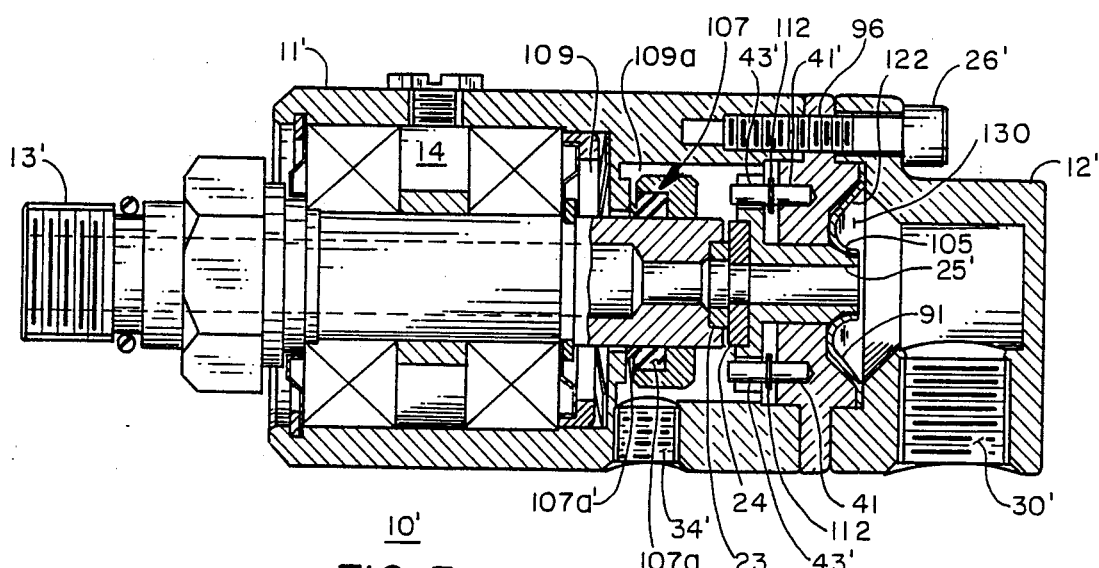
FIG. 3 is a side sectional view of the rotating union with its seal faces engaged.

Referring to FIGS. 2 and 3, there is illustrated a rotating union 10' provided in accordance with the present invention. The rotating union 10' is generally similar to the rotating union 10 illustrated in FIG. 1, but includes a rotating seal member 23' and a non-rotating seal member 24', which are maintained engaged or disengaged from one another as a function of whether or not coolant or other fluid is being conducted through the rotating union 10'. Elements of union 10' which are similar to those of union 10 have been given the same reference number with a prime notation.

More specifically, referring to FIG. 2, the rotating seal member 23 is carried by rotor 13' and permanently bonded thereto. The housing 11' defines an annular inwardly directed inner wall 51 having an aperture 52 through which passes one end of rotor 13'. The non rotating seal member 24 is carried by an actuator mechanism 42 which defines a floating seal assembly including seal 24, a sleeve 25' which carries the seal 24 and a diaphragm 91. The actuator mechanism moves the seal 24 into and out of engagement with seal 23 as a function of the presence or absence of fluid flow through the union. The seal members 23 and 24 are annular shaped elements made of silicon carbide for example, providing opposing annular silicon carbide to silicon carbide seal faces.

The actuator mechanism 42 including a circular diaphragm 91 is located within a cavity 92 defined by a counterbored inner end 93 of the end cap 12,. The housing assembly includes an insert member 96 interposed between the housing 11' and the end cap 12'. The insert member 96 mounts the sleeve 25' of the actuator mechanism 42 within the housing for axial movement of the seal carrier sleeve 25' with the housing. The housing 11' may be made of steel. The end cap 12' and the insert 96 may be made of aluminum, for example.

The rotor 13' has a seal assembly 107 mounted thereon to prevent fluid from entering the bearing cavity 109 in which the bearings are located. The seal assembly 107 includes a "V"-ring 107a and a clamping band 107b which secures the "V"-ring to the rotor 13' and holds the "V"-ring in a fixed position on the shaft at high peripheral speeds. The "V"-ring has an annular lip portion 107a' which engages the inner wall 52 of the housing 11', which defines the bearing cavity 109 and a seal cavity 109a to provide a seal around the aperture 52 through which passes the end of the rotor 13'.

Figure 4:
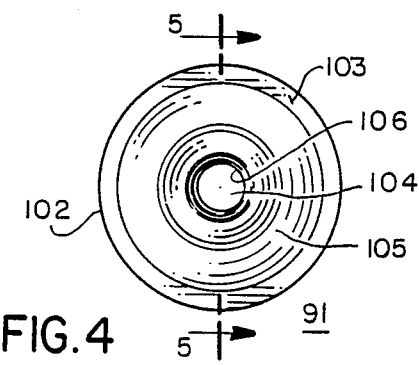
FIG. 4 is a plan view of a diaphragm of the rotating union of FIG. 2.
Figure 5:
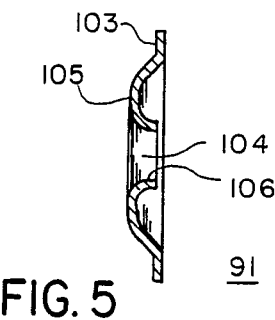
FIG. 5 is a view taken along the line 5—5 of FIG. 4.

Referring to FIGS. 2, 4 and 5, the diaphragm 91 is a generally circular element 102 having a peripheral edge 103 and a central aperture 104 therethrough. The diameter of aperture 104 is dimensioned to receive the hub 36' (FIG. 7) of sleeve 25'. The diaphragm 91 has an annular bowed portion 105 near its center, with its center edge portion 106 turned 90 degrees relative to the plane of the diaphragm, defining a mounting portion therefor. The diaphragm 91 is of a flexible material such as that commercially available under the tradename VITON.

Figure 7:
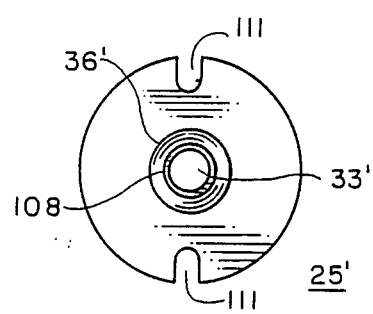
FIG. 7 is a plan view of a seal carrier sleeve for the non-rotating seal assembly of the rotating union of FIG. 2.

Referring to FIGS. 2 and 7, the sleeve 25' has an annular flange portion 38' and a generally cylindrical hub portion 36' with a throughbore 33' and with a peripheral edge formed with a counterbore 37' at its fluid outlet side thereof to receive the non-rotating seal member 24 which is bonded thereto. The flange 38' projects radially from the hub portion 36'. Key slots or apertures 111 are provided in the flange 38' at diametrically opposed positions. The tip or end of the sleeve member 25' has a reduced neck portion 108 defining a mounting surface for the inner edge portion 106 of the diaphragm.

Figure 6:
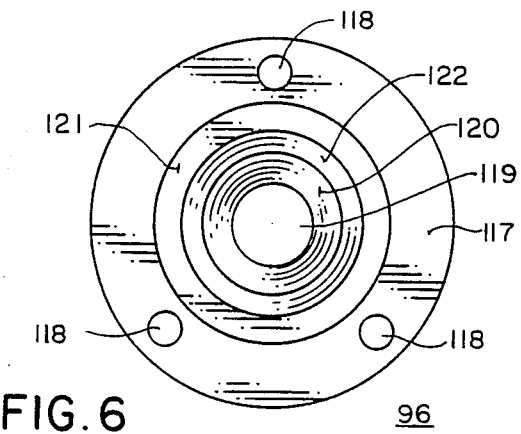
FIG. 6 is a plan view of an insert member of the rotating union of FIG. 2.

With reference to FIGS. 2 and 6, the insert member 96 is a generally annular element having a mounting flange portion 117 provided with three apertures 118, and a central aperture 119. The fluid inlet side of the insert member 96 has a recessed surface 120, a peripheral shoulder 121 and a sloping surface 122 which slants radially inwardly and downwardly from the shoulder 121 to the recessed inner surface 120 of the insert member 96. Recessed surface 120, shoulder 121 and sloping surface 122 defines a generally annular channel which extends around the tip of the hub portion of the sleeve 25' and receives the bowed portion 105 of the diaphragm 91. The rearward surface 124 of the insert member 96 has two key slots 41' formed therein for receiving index pins 43' which index the non-rotating seal member 24 and its carrier sleeve 25' to the insert member 96.

The index pins 43' have their distal ends secured to the insert member 96. The proximal ends of the index pins 43' define smooth glide surfaces for the sleeve member 25' which is received thereon for axial movement within the housing.

A retaining ring 112, such as the type 5135 retaining ring, commercially available from TRUARC TOOLS, is provided on each of the index pins 43' to limit the travel of sleeve 25' of the floating seal assembly and thereby reduce fluid leakage when the union is repressurized. That is, the axial distance that the sleeve 25' must travel to engage seal 24 with seal 23 is minimized because of the travel limit function provided by retaining rings 112. As illustrated in FIG. 2, for the unactuated condition for the floating seal assembly, sleeve 25' engages retaining rings 112. For the actuated condition, illustrated in FIG. 3, the sleeve 25' is moved out of engagement with the retaining rings 112. The travel distance is very small and has been exaggerated in the drawings in order to illustrate the function of the retaining rings 112.

Referring to FIGS. 2 and 4–7, in assembling the floating seal assembly in the union, the seal member 24 is positioned in the counterbore 37' of the sleeve 25' and permanently bonded thereto. Sleeve 25' is assembled with the insert member 96 with its cylindrical body portion 36' extending through bore 119 of the insert member. The index pins 43' are inserted through the apertures or key slots 111 in the flange 38' of the sleeve 25' and into the key slots 41' of the insert member 96. Then, the diaphragm 91 is assembled with the insert member 96 and the sleeve 25' with the tip of the hub portion 36' extending through the center aperture 104 in the diaphragm 91 and the peripheral or marginal edge 103 of the diaphragm 91 received on shoulder 121 of the insert member. The inner marginal edge 106 of diaphragm 91 is permanently secured to the tip of the sleeve member 25, on its reduced neck portion 108 in a suitable manner as by bonding.

The subassembly including the insert member 96, the diaphragm, and carrier sleeve is then positioned on the fluid inlet side of the housing 11' with the fluid actuated seal assembly. The end cap 12' is then positioned on the insert member 96 and secured to the housing 11' by machine screws 26' which pass through the aligned apertures in the housing, the insert member and the end cap 12'. The peripheral edge 103 of the diaphragm 91 is clamped between the inner surface of the end cap 12' and the shoulder 121 of the insert member which in turn abuts the housing 11'.

Referring to FIGS. 2 and 4, the outer surface of the diaphragm 91 and the inner surface of the end cap 12' define an annular pocket or channel 130 for receiving fluid for actuating the diaphragm 91. In FIG. 2, the diaphragm 91 is illustrated in its unactuated condition with the center portion 91a of the diaphragm 91 extending generally coplanar with the peripheral edge of the diaphragm and the bowed portion 108 out of contact with the sloping surface 122 of the insert member. In this position, the sleeve 25', which is carried by the diaphragm 91, is at a position in which the non-rotating seal 24 is maintained out of engagement with the rotating seal 23 carried by the rotor 13, the grip rings 112 limiting travel of the sleeve 25' towards its unpressurized position, i.e. to the right in FIG. 2. The grip ring 112 also defines a travel limit stop for the center portion of the diaphragm.

Referring now to FIG. 3, which illustrates the diaphragm actuator assembly in its actuated or pressurized position, in response to the introduction of fluid into the rotating union 10' through inlet 30', fluid enters the channel 130. Seals 23 and 24, initially are not engaged, and thus a small amount of the fluid that flows through bore 33 in sleeve 25' may flow into the cavity 109a. The "V"-ring lip seal 107a prevents such fluid from flowing into the bearing cavity 109. The force of the fluid against the diaphragm 91 flexes the diaphragm, driving the bowed portion 105 of the diaphragm 91 into engagement with the sloping surface 122, moving the sleeve 25', which slides on index pins 43', in the direction of fluid flow through the union, i.e. towards the left in FIG. 3, driving the non-rotating seal member 24 into engagement with the rotating seal member 23.

The fluid actuated diaphragm assembly will maintain the non-rotating seal 24 in engagement as long as fluid pressure is maintained through the rotating union. When fluid pressure decreases to a value which is insufficient to maintain the diaphragm flexed, the diaphragm restores under the force of its resilience, moving the sleeve 25' towards the right in FIG. 3, disengaging seal member 24 from seal member 23. The retaining ring 112 limits the travel of the sleeve 25'.

Thus, when the rotating union 10' is operating without fluid flow through the union, the seal members are maintained out of engagement with one another so that the union does not operate with the seals engaging while in an unlubricated condition. Whenever fluid is conducted through the union 10', the diaphragm actuator assembly responds to the pressure and maintains the seal members engaged, and the fluid lubricating the engaging seal surfaces. This fluid responsive seal arrangement not only minimizes wear on the seal surfaces, but also enables the union 10' to operate at high speeds, up to about 25,000 revolutions per minute. This increases the scope of applications of the rotating union 10' provided by the present invention.

I claim:

1. In a rotating union including a housing, a rotor rotatably mounted in the housing and adapted for coupling to a rotating device which is adapted to receive fluid conducted through the rotating union, a discharge passageway extending axially through the rotor, a fluid inlet chamber in the housing, and sealing means providing a rotating seal between said inlet chamber and the discharge passageway, said sealing means comprising:

rotating seal means mounted on the rotor to rotate with the rotor and having a seal surface, non-rotating seal means located in the inlet chamber and having a seal surface opposing said seal surface of said rotating seal means, said non-rotating seal means being supported for movement within the inlet chamber axially of the housing between a first position in which said non-rotating seal means is spaced apart from said rotating seal means and a second position in which said seal surface of said non-rotating seal means engages said seal surface of said rotating seal means, and fluid actuated means in the inlet chamber urging said non-rotating seal means to its first position in the absence of fluid pressure within said inlet chamber whereby said seal surface of said non-rotating seal means is maintained disengaged from said seal surface of said rotating seal means, and said fluid actuated means responding to fluid pressure within said inlet chamber to move said non-rotating seal means to its second position, driving said seal surface of said non-rotating seal means into engagement with said seal surface of said rotating seal means and to maintain said seal surfaces in engagement.

2. In a rotating union including a housing, a rotor rotatably mounted in the housing and having an inlet end and an outlet end projecting from one end of the housing for coupling to a rotating device which is adapted to receive fluid conducted through the rotating union, a discharge passageway extending axially through the rotor between its inlet and outlet ends, a fluid inlet chamber defined by a generally cylindrical inner wall portion of the housing at the other end of the housing, inlet means communicating with said inlet chamber and adapted for connection to a source of fluid, and sealing means providing a rotating seal between said inlet chamber of the housing and the discharge passageway of the rotor, said sealing means comprising:

rotating seal means including a first seal member having an annular seal surface, said first seal member being mounted on the rotor to rotate with the rotor, non-rotating seal means including a second seal member having an annular seal surface, said non-rotating seal means being located in the inlet chamber with said seal surface of said second seal member opposing said seal surface of said first seal member, said second seal member being supported for movement within the inlet chamber axially of the housing between a first position in which said second seal member is spaced apart from said first seal member and a second position in which said seal surface of said second seal member engages said seal surface of said first seal member, and fluid actuated means mounted in the inlet chamber and connected to said non-rotating seal means for urging said non-rotating seal means to its first position in the absence of fluid flow through said inlet chamber, whereby said seal surface of said non-rotating seal member is maintained disengaged from said seal surface of said rotating seal member, and said fluid actuated means responding to fluid pressure within said inlet chamber to move said non-rotating seal means to said second position, driving said seal surface of said second seal member into engagement with said seal surface of said first seal member and to maintain said seal surfaces in engagement.

3. In a rotating union including a housing, a rotor rotatably mounted in the housing at one end thereof and adapted for coupling to a rotating device which is adapted to receive fluid conducted through the rotating union, a discharge passageway extending axially through the rotor, a fluid inlet chamber at the other end of the housing, and sealing means providing a rotating seal between said inlet chamber of the housing and the discharge passageway of the rotor, said sealing means comprising: rotating seal means mounted on the rotor to rotate with the rotor and having a seal surface, non-rotating seal means located in the inlet chamber and having a seal surface opposing said seal surface of said rotating seal means, said non-rotating seal means being supported for movement within the inlet chamber axially of the housing between a first position in which said non-rotating seal means is spaced apart from said rotating seal means and a second position in which said seal surface of said non-rotating seal means engages said seal surface of said rotating seal means, and fluid actuated means including a diaphragm located within the inlet chamber and connected to said non-rotating seal means, said diaphragm being constructed and arranged to sense fluid pressure through said inlet chamber and to move said non-rotating seal means between said first and second positions as a function of the absence and presence of fluid pressure through said inlet chamber, said diaphragm acting upon said non-rotating seal means to maintain said non-rotating seal means at said first position to maintain said seal surfaces disengaged from one another in the absence of fluid flow through said inlet chamber, and to move said non-rotating seal means to said second position, driving said seal surface of said non-rotating seal means into engagement with said seal surface of said rotating seal means in response to fluid pressure through said inlet chamber, and maintaining said seal surfaces in engagement as long as pressure continues through said inlet chamber.

4. A rotating union according to claim 3, wherein said diaphragm is interposed in a fluid flow path from said inlet chamber to the inlet of the discharge passageway through the rotor, said diaphragm having a central portion with an aperture communicating the inlet chamber with the discharge passageway and an annular portion cooperating with an inner surface of the housing to define a fluid receiving compartment which receives fluid in response to fluid pressure through the inlet chamber for actuating said diaphragm, causing said diaphragm to move said non-rotating seal means.

5. A rotating union according to claim 4, wherein said housing defines an annular slot receiving said peripheral edge portion of said diaphragm for securing said diaphragm to said housing comprising means coupling said diaphragm near its center portion to said non-rotating seal means.

6. A rotating union according to claim 4, wherein said inner surface of said housing which defines said inlet chamber has an annular surface which slopes inwardly in the direction of fluid flow therethrough, said diaphragm being mounted within said inlet chamber adjacent to said sloping surface and being flexed in its annular portion to engage said sloping surface in response to fluid pressure through said inlet chamber.

7. A rotating union according to claim 4, wherein said fluid actuated means includes means for limiting the travel of said non-rotating seal means in moving between said first and second positions.

8. A rotating union according to claim 4, wherein said non-rotating seal means includes a seal member and a sleeve member carrying said seal member and movable axially of said housing, said sleeve member having a generally cylindrical portion extending axially of the inlet chamber of the housing and a peripheral mounting flange portion provided with first and second apertures aligned with first and second apertures formed in an interior surface of the housing, and key means inserted through the aligned apertures in said flange portion and in the housing to set the non-rotating seal means relative to the housing thereby preventing rotational movement of said non-rotating seal means within the housing.

9. A rotating union according to claim 8, which includes travel limit means for limiting the axial travel of said sleeve member within said housing.

10. A rotating union according to claim 9, wherein said key means defines at least one guide track for said sleeve member, said travel limit means including retaining means carried by said key means and located on said guide track in the path of said sleeve member.

11. A rotating union according to claim 4, wherein said housing defines a bearing compartment for locating a bearing assembly for said rotor, and further comprising seal means carried by said rotor for preventing fluid from flowing into said bearing chamber when said seal means are disengaged.

12. In a rotating union including a housing, a rotor rotatably mounted in the housing and having an inlet end and an outlet end projecting from one end of the housing for coupling to a rotating device which is adapted to receive fluid conducted through the rotating union, a discharge passageway extending axially through the rotor between its inlet and outlet ends, a fluid inlet chamber defined by a generally cylindrical inner wall portion of the housing at the other end of the housing, inlet means communicating with said inlet chamber and adapted for connection to a source of fluid, and sealing means providing a rotating seal between said inlet chamber of the housing and the discharge passageway of the rotor, said sealing means comprising: rotating seal means including a first seal member having an annular seal surface, said first seal member being mounted on the rotor to rotate with the rotor, non-rotating seal means including a second seal member having an annular seal surface, said non-rotating seal means being located in the inlet chamber with said seal surface of said second seal member opposing said seal surface of said first seal member, said second seal member being supported for movement within the inlet chamber axially of the housing between a first position in which said second seal member is spaced apart from said first seal member and a second position in which said seal surface of said second seal member engages said seal surface of said first seal member, and fluid actuated means including a diaphragm located within the inlet chamber and connected to said non-rotating seal means, said diaphragm being constructed and arranged to sense fluid pressure through said inlet chamber and to move said non-rotating seal member between said first and second positions as a function of the absence and presence of fluid pressure through said inlet chamber, said diagram acting upon said non-rotating seal means to maintain said non-rotating seal means at said first position to maintain said seal surface of said second seal member disengaged from said seal surface of said first seal member in the absence of fluid flow through said inlet chamber and to move said non-rotating seal means to said second position, driving said seal surface of said second seal member into engagement with said seal surface of said first seal member in response to fluid pressure through said inlet chamber, and maintaining said seal surfaces in engagement as long as fluid continues to flow through said inlet chamber.

13. A rotating union according to claim 12, wherein said diaphragm is interposed in the fluid flow path from said inlet means to the inlet of the discharge passageway through the rotor, said diaphragm having a central portion with an aperture communicating the inlet means with the discharge passageway and an annular portion cooperating with an inner surface of the housing to define a fluid receiving compartment which receives fluid in response to fluid pressure through the inlet chamber for actuating said diaphragm, causing said diaphragm to move said non-rotating seal means.

14. A rotating union according to claim 13, wherein said housing defines an annular slot receiving said peripheral edge portion of said diaphragm for securing said diaphragm to said housing.

15. A rotating union according to claim 14, wherein said inner surface of said housing which defines said inlet chamber has an annular surface which slopes inwardly in the direction of fluid flow therethrough, said diaphragm being mounted within said inlet chamber adjacent to said sloping surface and being flexed in its annular portion to engage said sloping surface in response to fluid flow through said inlet chamber.

16. A rotating union according to claim 14, wherein said non-rotating seal means includes a sleeve member carrying said second seal member, said sleeve member having a generally cylindrical portion extending axially of the inlet chamber of the hosing and a peripheral mounting flange portion provided with first and second apertures aligned with first and second apertures formed in an interior surface of the housing, and key means inserted through the aligned apertures in said flange portion and in the housing defining at least one guide track for said sleeve and setting the non-rotating seal means relative to the housing thereby preventing rotational movement of said non-rotating seal means within the housing.

17. A rotating union according to claim 16, wherein said key means includes travel limit means engage able by said sleeve to limit the travel of said sleeve between said first and second portions.

18. A rotating union according to claim 12, wherein said housing defines a bearing compartment for locating a bearing assembly for said rotor, and further comprising lip seal means carried by said rotor for preventing fluid from flowing into said bearing chamber when said first and second seal members are disengaged from one another.

19. In a rotating union including a housing, a rotor rotatably mounted in the housing and having an inlet end and an outlet end projecting from on end of the housing for coupling to a rotating device which is adapted to receive fluid conducted through the rotating union, a discharge passageway extending axially through the rotor between its inlet and outlet ends, a fluid inlet chamber defined by a generally cylindrical inner wall portion of the housing at the other end of the housing, inlet means communicating with said inlet chamber and adapted for connection to a source of fluid, and sealing means providing a rotating seal between said inlet chamber of the housing and the discharge passageway of the rotor, said sealing means comprising:

rotating seal means including a first seal member having an annular seal surface, said first seal member being mounted on the rotor at its fluid inlet end to rotate with the rotor, non-rotating seal means including a second seal member having an annular seal surface, said non-rotating seal means being located in the inlet chamber with said seal surface of said second seal member opposing said seal surface of said first seal member, said second seal member being supported for movement within the inlet chamber axially of the housing between a first position in which said second seal member is spaced apart from said first seal member, and a second position in which said seal surface of said second seal member engages said seal surface of said first seal member, and fluid actuated means including a flexible diaphragm mounted within the inlet chamber and interposed in the fluid flow path from said inlet means to the inlet of the discharge passageway through the rotor, said diaphragm having a peripheral edge portion secured to the inner surface of the housing, a central portion with an aperture communicating the inlet means with the discharge passageway, and an annular portion intermediate said central portion and said peripheral edge portion, and means connecting said diaphragm to said non-rotating seal means, said diaphragm being unflexed in the absence of fluid pressure through said inlet chamber, thereby maintaining said non-rotating seal means at said first position t maintain said seal surfaces of said first and second seal members disengaged from one another in the absence of fluid pressure through said inlet chamber, and said diaphragm being responsive to fluid pressure through the inlet chamber to move said non-rotating seal means to said second position, driving said seal surface of said second seal member into engagement with said seal surface of said first seal member and maintaining said seal surfaces in engagement as long as fluid pressure continues through said inlet chamber.

20. A rotating union according to claim 19, wherein said inner wall portion of said housing which defines said inlet chamber has an annular surface which slopes inwardly in the direction of fluid flow therethrough, said diaphragm being mounted within said inlet chamber adjacent to said sloping surface and being flexed in its annular position to engage said sloping surface in response to fluid pressure through said inlet chamber.

* * * * *

UNITED STATES PATENT AND TRADEMARK OFFICE
CERTIFICATE OF CORRECTION

PATENT NO. : 4,976,282

DATED : December 11, 1990

INVENTOR(S) : Zbigniew Kubala

It is certified that error appears in the above-identified patent and that said Letters Patent is hereby corrected as shown below:

Column 6, line 10, change "25," to ---25'---;

Column 12, line 17, change "t" to ---to---.

Signed and Sealed this

Fifth Day of May, 1992

Attest:

DOUGLAS B. COMER

*Attesting Officer*  Acting Commissioner of Patents and Trademarks